Feb. 17, 1970     P. H. WENDLAND     3,496,404
RADIATION TRANSDUCER
Filed March 27, 1968     3 Sheets-Sheet 1
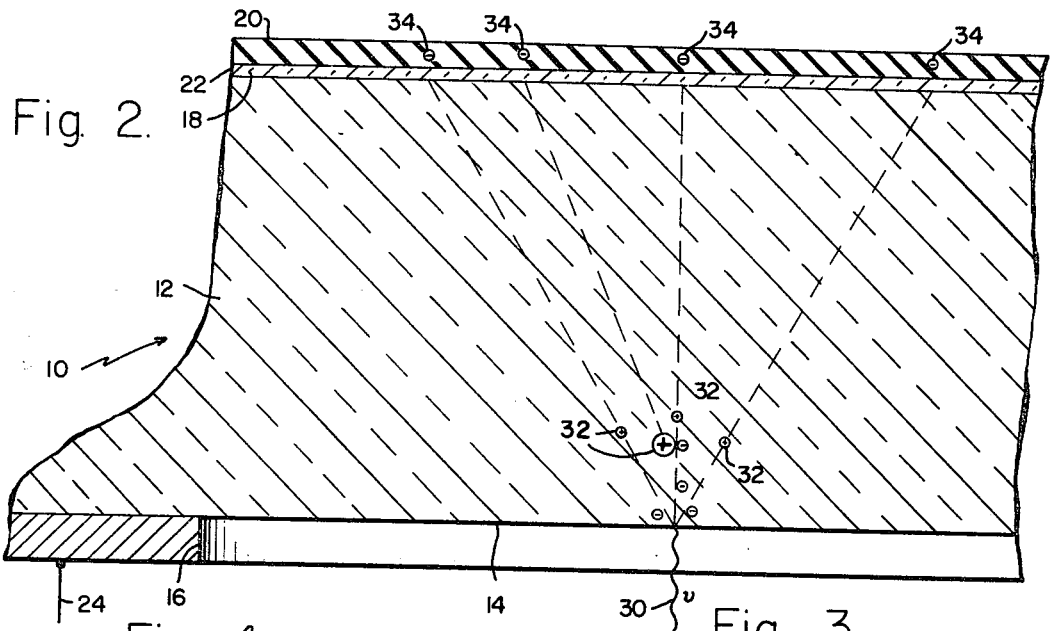
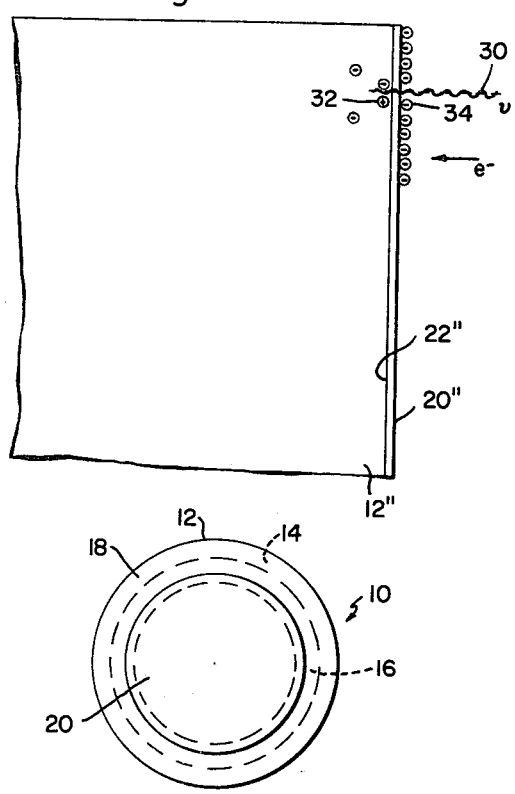
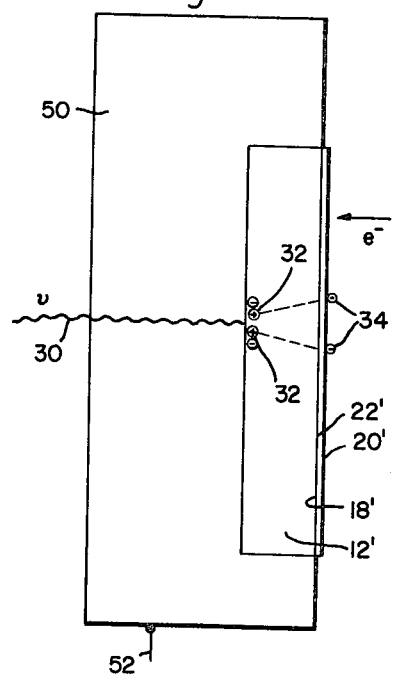
Paul H. Wendland,
INVENTOR.
BY.
GOLOVE & KLEINBERG
ATTORNEYS.

Paul H. Wendland,
INVENTOR.
BY.

GOLOVE & KLEINBERG,
ATTORNEYS.

3,496,404
RADIATION TRANSDUCER
Paul H. Wendland, Malibu, Calif., assignor to United
Detector Technology, Inc., Santa Monica, Calif.
Filed Mar. 27, 1968, Ser. No. 716,560
Int. Cl. H01j 31/48, 39/12
U.S. Cl. 315—11                                        31 Claims

ABSTRACT OF THE DISCLOSURE

A thin wafer of silicon of low resistivity is provided on one face, with a very thin (10 angstrom) barrier layer upon which is deposited a gold film (approximately 50 angstroms) that is too thin to support electrical conduction. On the opposite face of the silicon wafer, a conductive ring is applied for an ohmic contact to the silicon. An electrostatic charge applied to the non-conductive metal surface is selectively discharged by the impingement of an actinic beam on either face. The wafer can then be scanned electronically to signal "light" and "dark" areas.

---

This invention relates to radiation responsive devices and more particularly, to a photosensitive, charge storage device. The conversion of actinic radiation, such as an optical image, into corresponding electrical signals, is required in many information handling systems and is of primary importance in television systems. In its most general application, a storage device is needed, into which "information" may be entered or withdrawn at high speeds. A common form of high speed access to stored information involves the use of either light beams or electron beams or both, to write in or read out information. These have been combined in such devices as the orthicon, image orthicon, or vidicon picture tubes and the barrier grid storage tube.

Depending upon the application, electrostatic charge on a "non-conducting" surface must be affected by actinic radiation in a predetermined fashion so that an electronic interrogation of the storage device can provide a series of electrical signals that uniquely describe the charge state of the surface.

In the prior art, a mosaic or a grid of individual isolated, semiconductor junctions have been used as a target structure. The target is initially charged to a predetermined value and the photoconductive effect of an impinging actinic beam which may be a photon beam causes a different stored charge in each incremental area, the magnitude of which is directly related to the duration and intensity of the photon beam.

An electron beam scans the entire target in a predetermined fashion. A voltage or current signal, which is proportional to the charge required to restore each incremental area to the predetermined potential, represents, at each instant, the magnitude of photon illumination on the corresponding incremental area during the preceding exposure interval.

As a photoelectric transducer useful in television or reconnaissance system, the optical storage device must satisfy at least two requirements. It must have a high quantum efficiency for the conversion of actinic radiation over the spectral region of interest, which may range from the ultraviolet through the visible to the infrared, into charge carrier pairs. Further, the transducer must have a "dark" charge storage time which is greater than the time interval between successive image scans, which interval may be considered the "frame time." For most television and reconnaissance systems, a frame time is rarely greater than $\frac{1}{30}$ of a second, although some systems have been designed with longer frame times to utilize low-frequency information channels or low-energy signal transmission systems.

Prior art optical storage devices have utilized mosaic arrays or grids of discrete, reverse biased, p-n junctions in silicon, such as are described and shown in the patent to F. W. Reynolds, No. 3,011,089. Yet other structures of a mosaic, or at least discrete-element type, have been suggested as a target element, since the very high resistivity necessary for charge storage is difficult to achieve in semi-conductor materials. One such target has been described by the inventor in an article entitled "A Charge Storage Diode Vidicon Camera Tube" which was published in the June, 1967, IEEE Transactions on Electron Devices.

It is known that photoconductivity occurs in semiconductors when actinic radiation is incident upon the material. Further, it is recognized that p-n junctions can act as collectors of light-excited, minority carriers, and, that light incident on a reverse biased, p-n junction will induce current flow in an external circuit, corresponding to the flow of minority carriers across the junction. Such reverse biased, p-n junctions can store and charge for times in excess of $\frac{1}{30}$ of a second, as disclosed in the Reynolds patent above. A complete theory for achieving a storage effect in p-n junctions has been described by the inventor in the above mentioned article.

A similar photoresponsive property has been utilized with metal semiconductor structures. A silicon wafer can be etched and a film of a metal with the proper work function is evaporated on the etched surface to create a low leakage, light sensitive MS junction. This combination has been utilized as a single element light detector or as a nuclear particle detector. In order to assure low surface resistivity in the metal layer, a fairly thick metal layer is usually deposited.

According to the present invention, however, a thin, non-conducting metal film is evaporated over an etched semi-conductor surface to form what will be called a Metal-Barrier Semi conductor (MBS) junction in a single crystal wafer of n-type silicon.

The metal film is gold in a preferred embodiment. A thickness of approximately 50 angstroms should be sufficiently thin to have a surface resistivity in the range of $10^{10}$ ohms/square and therefore, may be considered to be substantially non-conductive. On the opposite or uncoated face of the silicon wafer, a layer of conductive aluminum is deposited in the non-image areas, as an ohmic contact. A charging electron beam, directed at the non-conductive metal or dielectric surface, charges the surface to a uniform potential. The dielectric-metal surface is capable of storing charges for periods in excess of $\frac{1}{30}$ of a second. As used herein, the term "dielectric" is intended to include very thin metal films the effective resistivity of which approaches $10^{10}$ ohms cm.

An actinic radiation beam, for example, a photon beam, impinging on the silicon, whether through the dielectric film or upon the silicon surface, creates charge carriers in direct proportion to the intensity and duration of the impinging photon beam. The minority carriers thus created migrate through the silicon body and through the MBS junction to neutralize charge stored in the dielectric. The effective migration path of any single minority carrier before capture, is sufficiently long to permit a carrier to reach and penetrate the boundary into the dielectric metal layer even if the beam impinges on the external silicon surface.

During a "frame time," the light flux reaching an incremental area of silicon produces a flow of minority carriers which discharge the dielectric surface in a directly corresponding area on the dielectric surface. Differing incremental areas of the dielectric surface will thus arrive at differing potentials, depending upon the amount of light present at each incremental area of the silicon. These potentials do not interact with each other since the dielectric layer in which they exist is substantially non-conductive.

When the charging electron beam returns to an incremental area after the completion of a scan, the extent of discharge during the prior interval can be determined by the amount of recharging that is necessary to restore the area to the fixed charge level. An appropriate video signal can then be presented to the external system.

According to the present invention an improved photosensitive storage device or target is provided having continuous, homogeneous, obverse and reverse surfaces. An actinic radiation image is focused upon one of the faces of the target, and this image may be continuously read out by means of an electron beam, as in a vidicon camera tube or other electro optical device. However, the target can also be utilized as an electrostatic storage device, in which case the target can be "written" on with an electron gun on one side and "read out" with another electron gun, either on the same side or on the opposite side. The target can be "cleared" by flooding either side with additional actinic radiation.

The storage device or target of the present invention comprises in the preferred embodiment, a single-crystal wafer of n-type silicon of approximately one mil thickness. One surface of the wafer is treated to form a barrier layer of high effective resistivity by etching with a mixture of nitric, acetic and hydrofluoric acid. A metal with the proper work function, such as gold, is evaporated onto the surface to form a low leakage, light sensitive, MBS junction. The gold layer is held sufficiently thin (approximately 50 angstroms in the preferred embodiment) to have a high resistivity, greater than $10^{10}$ ohms/square and may be considered a dielectric layer. The silicon surface has applied thereto, a conductive metal ring surrounding the image format area which serves as an ohmic contact. The structure can then be utilized in place of the conventional mosaic or multi-junction targets in, for example, a vidicon tube.

In alternative embodiments, higher resolution target structures can be created. A thinner wafer of silicon (i.e. less than one mil), prepared as in the preferred embodiment, can provide a higher resolution, if used in configurations that apply the actinic radiation to the silicon surface and the scanning charging electron beam to the dielectric surface. The thickness of the wafer may be limited by considerations of mechanical strength to maintain the structural integrity of the wafer. If the configuration of use applies both the actinic radiation and the scanning/charging electron beam to the dielectric side, the dielectric layer is sufficiently thin to be substantially transparent to the actinic radiation. The silicon-barrier interface then becomes the site of the generation of the charge pairs.

The minority carriers thus created immediately migrate through the barrier layer to discharge the dielectric layer. The image diffusion which normally results when the minority carriers must transit the thickness of the silicon wafer, does not occur. In this embodiment, the crystal wafer can be of any convenient thickness, without adversely affecting image resolution.

Other embodiments could employ other semiconductor materials in a similar MBS combination, so long as the semiconductor resistivity ranged from .05Ω cm. to 50Ω cm. and the quantum efficiency for the actinic radiation of interest exceeded .05% of the created carriers at the barrier junction. Using other materials, in order to achieve the optimum performance characteristics of long charge storage and high quantum efficiency, it may be necessary to cool the semiconductor material to very low temperatures.

The barrier layer between the semiconductor and the dielectric must be of high effective resistivity and integral with the semiconductor to create a "junction." This consideration may impose independent limitations on the choice of semiconductor materials. Yet another parameter that must be considered for satisfactory operation is that the leakage currents across the barrier at the operating potentials (between the dielectric surface and the semiconductor body) must not exceed 15 $\mu$amps/cm.$^2$. Since, according to the present understanding of the semiconductor phenomenon, the barrier must permit the field to extend into the semiconductor body, the barrier should be integral with the body. Therefore, the barrier is preferably formed by etching and perhaps oxidizing the surface. It is also possible to "neutralize" the surface, form a thin oxide layer and add the dielectric layer. Yet another process requires the cleavage of a single crystal in a vacuum of approximately $10^{-4}$ mm. Hg, and then the evaporating of a thin gold film directly onto the silicon surface.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

In the figures:

FIG. 1 is a top view of a phototransducer according to the present invention;

FIG. 2 is a side section view, distorted in scale of the transducer of FIG. 1;

FIG. 3 is a side section view of an alternative embodiment of a transducer according to the present invention in which a silicon wafer is embedded in a transparent, conducting matrix;

FIG. 4 is a section view of another alternative embodiment of a transducer according to the present invention in which the exposing beam, the charging beam and the scanning beam all come from the same direction;

Figure 5:
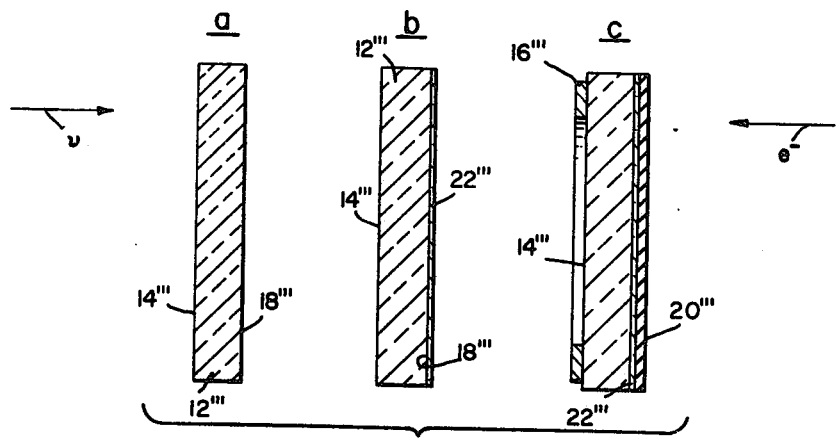
Figure 6A:
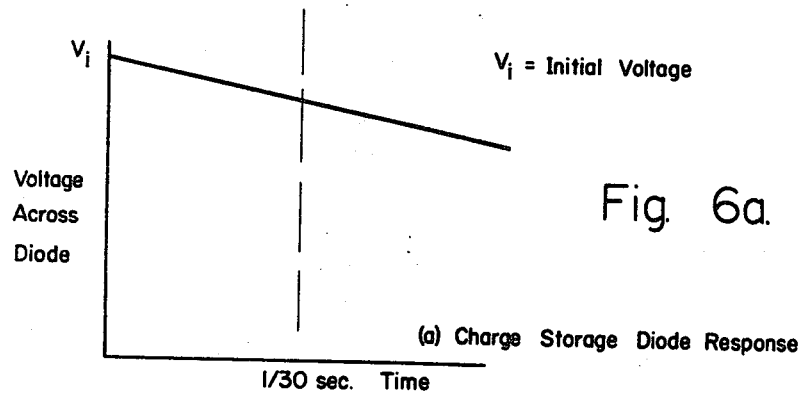
Figure 6B:
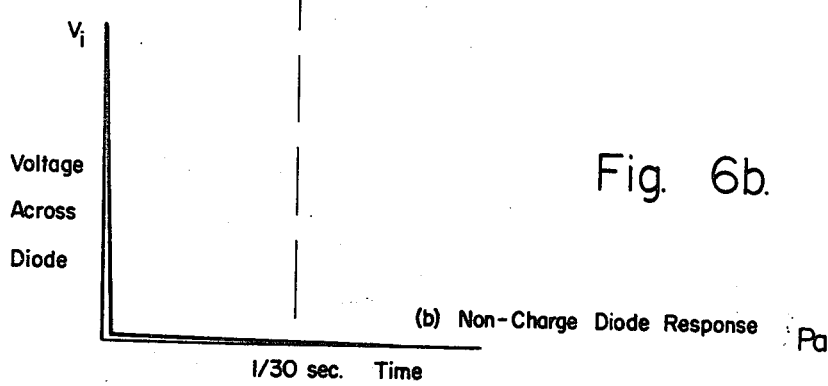
Figure 7A:
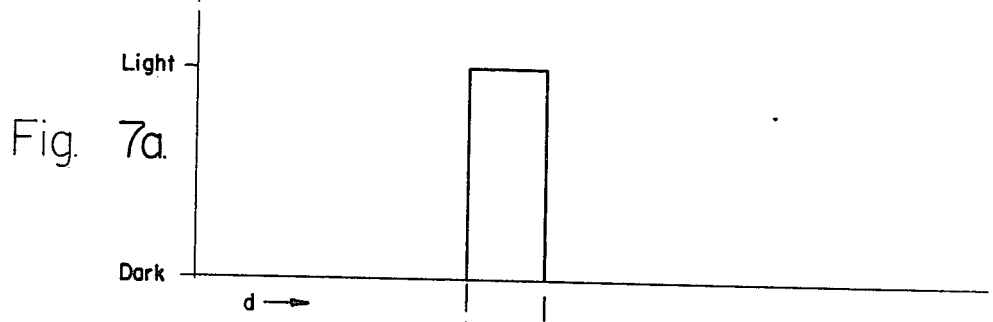
Figure 7B:
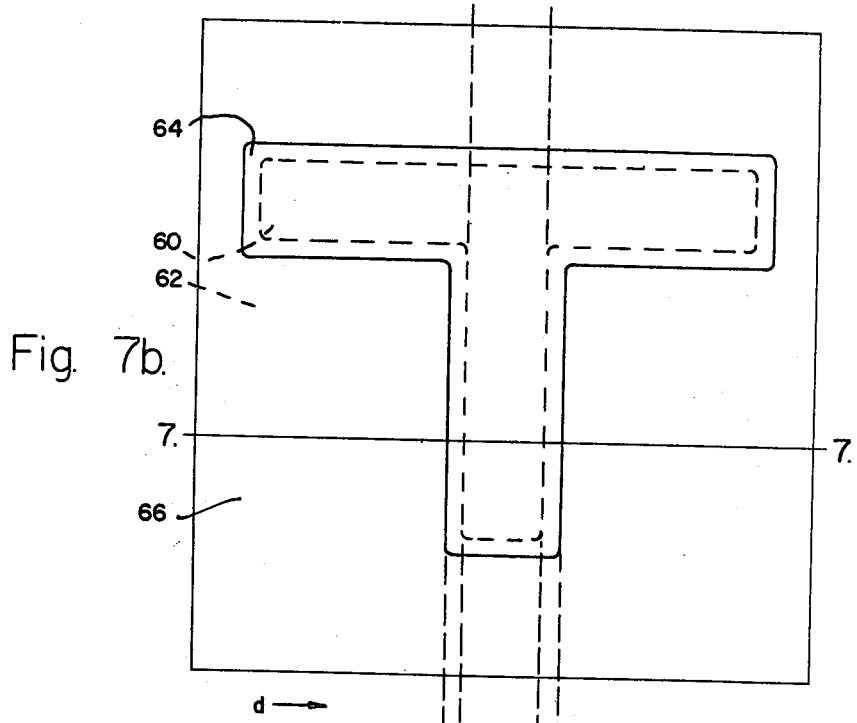
Figure 7C:
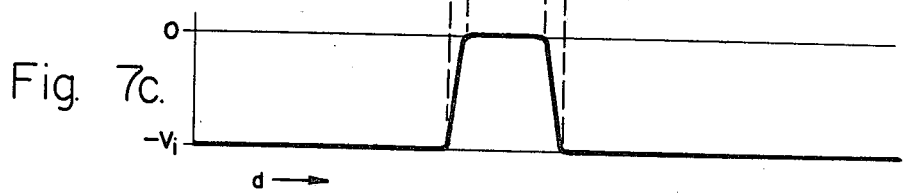

FIG. 5, including FIGS. 5a, 5b and 5c illustrates the process of producing the transducer of FIG. 1;

FIG. 6, including FIGS. 6a and 6b are graphs of voltage decay with time drawn to a common time base; and FIG. 7, including FIGS. 7a, 7b and 7c illustrate a radiant image applied to a transducer according to the present invention and the radiation and electrostatic charge profiles existing at the reverse and obverse surfaces of the transducer.

For the purpose of the present specification and claims it will be understood that the term "actinic radiation" describes the optical image or photon stream comprising an image whether or not a chemical effect is produced. While "actinic" generally presupposes a chemical change, here the term is intended to cover that portion of the electromagnetic radiation spectrum, the "photons" of which are capable of interacting with a semiconductor to create a charge carrier pair in the material. The spectrum is extended to include, in view of the deBroglie duality, sub-atomic particles, as well.

The term "charged beam" has been used to mean a beam composed of particles such as electrons, positrons, protrons, or ions, which are capable of impinging upon a non-conductive or dielectric surface, and which can impart an electrostatic charge thereto. The term is also intended to encompass a corona discharge phenomena which can also apply an electrostatic charge to a dielectric.

The terms "charge carriers" or "charge carrier pair" are intended to include the majority and minority charge carriers in a semiconductor material, and, of course, include minority carriers. The terms "lamina" and "laminate" are intended to mean a relatively thin layer of material, and, in the claims, apply to the multilayer combination of the semi-conductor, the barrier layer and the non-conducting dielectric layer, which, in combination comprise the Metal Barrier Semi-conductor (MBS) junction.

The terms "obverse" and "reverse" if used in the claims distinguish as between the two faces of a target structure, formed according to the present invention. For convenience, the term "obverse face or surface" will be applied to the dielectric surface which stores electrostatic charge, and the term "reverse face or surface" will be applied to the conducting surface of the semi-conductor, which, in some embodiments receives the impinging radiation.

In FIGS. 1 and 2, there is illustrated an embodiment that is preferred for its applicability as a vidicon target. As is known, the vidicon employs the phenomenon of photoconductivity to transduce light signals into electrical signal is to be generated by the illuminated and non-time of the photoconductor be substantially greater than the $\frac{1}{30}$ second television raster scan time if a different signal is to be generated by the illumination and non-illuminated regions of the target when they are scanned by the readout electron beam. In addition, a fast time response at all light levels is desired; for special applications, a spectral response is required with high quantum efficiency in a variety of regions: the infrared, the visible, and/or the ultraviolet. The materials successfully used to date for vidicon operation are compound semi-insulators with relatively large bandgaps and resistivities above the $10^{11} \Omega$ cm. necessary to exhibit RC relaxation times greater than $\frac{1}{30}$ second. The most common vidicon target material in actual use is antimony trisulfide. This material exhibits an effective peak quantum efficiency of 7%, a spectral response from 4000 A. to 7000 A., and a "time lag" at low light levels.

Materials with bandgaps below about 1.8 ev. do not exhibit a room temperature bulk resistivity large enough to qualify for charge storage vidicon operation. For example, silicon (with a bandgap of 1.08 ev. does not exhibit a room temperature bulk resistivity large enough to qualify for charge storage vidicon operation. For example, silicon (with a bandgap of 1.08 ev. and a room temperature intrinsic resistivity of approximately $3 \times 10^5$ ohm cm.) is at least six orders of magnitude too low in bulk resistivity to be utilized as a conventional, photoconductive vidicon target.

According to the present invention, a design exists which allows a room temperature dark charge storage time in excess of the $\frac{1}{30}$ second required for true vidicon operation. This design utilizes the unique capacitance and reverse current characteristics obtainable in specially designed "junction" structures. A rather surprising result is that low resistivity base material must be employed in contrast to the usual requirement for extremely high resistivity in a bulk photoconductor vidicon. The essential features of this approach are not limited to silicon and germanium, but can be applied to any desired material which exhibits too low a resistivity for bulk photoconductor vidicon operation but can be formed into a junction structure according to the present invention. A silicon diode vidicon is feasible which would have characteristics which are not obtainable in present state-of-the-art camera tubes and which are readily determined from the known photo-properties of silicon junctions: a spectral response from 3000 A. to 11,000 A., no time lag at low light levels (response time less than 10 $\mu$seconds), a quantum efficiency greater than 35%, and a linear relationship between photocurrent and incident light flux.

A target structure 10 includes a silicon base wafer 12 having a reverse face 14, a conductive aluminum ring 16 collector on the reverse face 14, which provides an ohmic contact with the silicon wafer 12, and an opposite, obverse face 18, including a non-conducting gold film 20. It is understood that at the interface between the gold film 20 and the reverse face 14 of the silicon wafer 12, there exists a thin, barrier layer 22, which may or may not be an oxide.

An electrical connection is made to the aluminum ring 16 with a conductor 24, which has a terminal 26 that can be utilized to derive the "video" output from the target 10. In the charge storage devices, generally, the signal representing the information stored is either a current or a voltage signal which can be impressed on a carrier and corresponds to the "interrogation" of a unique, discrete area.

For use in a vidicon, the structure of FIGS. 1 and 2 has a resolution of approximately 500 lines to the inch which is adequate for conventional television systems. Such resolution is easily achieved if the semiconductor wafer is no more than 1 mil thick. Photons 30 impinging on the reverse surface 14 produce charged pairs, the minority carriers 32 of which migrate to the obverse surface 18 and through the barrier layer 22 to neutralize captured electrons 34 in the dielectric layer 20.

The dispersion or diffusion of the minority carriers 32 as they traverse the wafer is a function of the thickness of the wafer. As a "rule of thumb," the thickness of the wafer should be no greater than the desired resolution, to avoid image degradation by lateral diffusion. Further, the range of travel of the minority carriers before "capture" by the semiconductor must be somewhat greater than the thickness of the wafer, although some margin is provided if photons penetrate the wafer and form the charge pairs within the crystal body. For higher, i.e. greater resolution, thinner wafers can be employed. Present day techniques can permit wafers of $\frac{1}{2}$ mil thickness to be prepared according to the present invention for use as a vidicon target.

If necessary, thinner wafers which may lack structural stability may be embedded in a "matrix" of a transparent, conductive epoxy, which can provide the necessary structural support, as shown in FIG. 3.

A wafer 12' is surrounded by a transparent, conductive epoxy holder 50, to which an electrical conductor 52 is attached. The wafer 12' has a dielectric coating 20' over a barrier layer 22' on its obverse surface 18'. The transparent conductive holder 50 replaces the conductive aluminum ring 16 of FIG. 2 and provides structural support to the normally fragile, thin wafer 12'. If the wafer 12' is embedded prior to the preparation of the obverse face 18', the holder 50 permits the wafer 12' to be ground and/or polished to any desired thickness, after which the barrier and dielectric layers 22', 20' can be applied. The target is then utilized in the same manner as the preferred embodiment of FIGS. 1 and 2.

In an alternative embodiment, a photo responsive transducer element can be provided, which is "written" into and "read" from, on the same side. Turning next to FIG. 4, there is shown a semiconductor wafer 12", the thickness of which is immaterial to the present embodiment of the invention. Obviously, economic considerations will dictate an appropriate thickness.

As in the structure of FIG. 1, a boundary layer 22" and a dielectric layer 20" are applied to the obverse surface 18" of the wafer 12". The dielectric layer 20' can be the thin (50 A.) layer of gold, which is electrically non-conductive in the lateral direction. For the actinic radiation spectrum of interest, the normally high reflectivity of metallic gold does not obtain, and the dielectric layer 20" is substantially transparent to impinging photons 30.

The photons 30, as before, produce carrier charge pairs at the site which may be at the silicon-barrier interface. However, the minority carriers 32 immediately migrate across the barrier layer 22" to neutralize charges stored in the dielectric layer 20". Because of the reverse bias at the barrier, few, if any minority carriers 32 will remain in the body of the semiconductor wafer 12" and substantially all of the carriers will be available to the dielectric layer 20". Since the combined thickness of the barrier layer and the dielectric layer is rarely greater than 100 A., there is virtually no spreading or diffusing of an image. The resolution available is therefore limited only by the resolution of the scanning or reading technique utilized. If an n-type semi-conductor body is used, then a negative electrostatic charge is stored in the dielectric layer, thereby creating a reverse bias across the barrier layer. In the preferred embodiment of a vidicon target, the charging beam is also the scanning electron beam.

Since for the necessary charge storage time the leakage across the barrier should be less than 15 $\mu$amps/cm.$^2$, the optimum value of the potential difference at the barrier can be determined for each semi-conductor barrier-dielectric combination. Normally a potential difference of about 10 volts is appropriate.

Should a p-type semiconductor material be employed, charging would be accomplished with either a positively charged beam (protons, positrons, positive ions) or a corona discharge.

Once the dielectric layer has been charged to its operating potential, the actinic beam is directed to one of the surfaces of the semiconductor. Through the creation of the charge-carrier pairs at the sites of radiation impingement, the minority carriers of the pairs are capable of neutralizing charge in the next adjacent sites of the dielectric layer.

At the completion of a charge-exposure cycle, an electrostatic charge image exists in the dielectric layer that corresponds identically to the actinic radiation image. Dark areas of the actinic image (corresponding to little or no radiation) are represented by fully charged areas in the electrostatic image. Similarly, bright areas of the actinic image (corresponding to high intensity radiation) are represented by discharged or electrostatically neutral areas in the electrostatic image. The gradations between dark and bright in the actinic image are represented by corresponding gradations between charged and discharged areas in the electrostatic image.

As the vidicon application, a scanning beam then "reads" the electrostatic image thus produced and, as in the vidicon, the scanning beam also recharges the dielectric layer to the uniform potential. The magnitude of the current flowing through the target during the recharging of each discharged elemental area results in the useful video signal, representing the magnitude of actinic radiation impinging upon the elemental area during the prior cycle. Alternatively, a voltage signal may be developed, the magnitude of which is representative of and proportional to the actinic radiation.

Other "scanning or reading" techniques are possible, such as are employed in conventional charge storage tubes, image orthicon tubes, orthicon tubes or image dissector tubes, and the above read out technique is suggested only as exemplary of the state of the art.

The parameters which are presently believed to be important in extending the teachings of the present invention to utilize other materials are summarized as follows:

TABLE I

| | 1 | 2 |
|---|---|---|
| (a) Resistivity of semi-conductor. | .05–50 ohm cm. | 1–10 ohm cm. |
| (b) Photosensitivity or quantum efficiency. | No less than .1% | 10% or greater. |
| (c) Barrier layer leakage current. | No greater than 15 $\mu$amp/cm.$^2$ | 1.0 $\mu$amp/cm.$^2$ |
| (d) Net work function difference between dielectric and barrier. | No less than +0.2 ev. | Greater than +.5 ev. |

Turning next to FIG. 5, which includes FIGS. 5a, 5b and 5c, the steps which may be employed to produce a storage device of the present invention, are indicated. As shown in FIG. 5a, a single crystal of silicon is fabricated into a plane parallel wafer 12''' approximately 1 mil thick. The reverse face 14''' is polished to receive actinic radiation.

The obverse face 18''' is treated by etching for approximately (10) minutes in a bath comprised of nitric acid (10 parts), acetic acid (5 parts) and hydrofluoric acid (1 part). This acid etch is intended to "neutralize" the surface and to promote the formation of a high effective resistivity barrier layer 22''' through partial oxidation during the etching step.

After etching, the wafer 12''' is boiled in distilled water to remove residual etchant and to promote further formation of the very thin oxide coating for the barrier layer 22''', as indicated in FIG. 5b. The wafer 12''' is then transferred to a vacuum chamber, in which a gold film 20''' is evaporated over the barrier layer 22'''.

A separate, monitor slide (not shown) may be employed to assure that the gold film is sufficiently thin to be nonconductive. A thickness of approximately 50 A. usually creates an adequate dielectric layer of appropriate work function, that is laterally non-conductive with a resistivity of approximately $10^{10}$ ohms/square.

As a final step, as indicated in FIG. 5c, a ring (or other format boundary) of aluminum 16''' is evaporated or otherwise applied to the reverse surface 14''' to provide an ohmic contact with the wafer 12'''. This ohmic contact is then utilized to transmit the electrical signals from the target element to the system which signals correspond to the actinic radiation flux impinging since the last interrogation of the target.

Alternative methods of preparing the multilayer storage device are known which neutralize the surface of the semi-conductor and which enable the formation of a barrier layer with the selected dielectric. In one such method, a single crystal of silicon is cleaved in a vacuum chamber, at a vacuum harder than $10^{-4}$ mm. Hg. A thin, non-conducting gold coating is then evaporated on the freshly cleaned surfaces. While such a combination apparently dispenses with the oxide barrier layer, a sufficient barrier exists between the gold and the silicon to permit semi-conductor action across the interface. A device fabricated from such a semi-conductor can be employed as a transducer.

Of the various materials exhibiting semi-conductor properties, it is possible to utilize any of them, if the parameters of Table I are satisfied. In the case of certain portions of the actinic radiation spectrum, it may be necessary to cool the semi-conductor to achieve optimum performance, that is, a charge storage time greater than $\frac{1}{30}$ sec. (.033 sec.) and a high quantum efficiency. Further, the semi-conductor should accept a barrier interface with a suitable "dielectric" material to satisfy the work function requirement without excessive leakage across the barrier (less than 15 $\mu$amps/cm.$^2$) at the working voltages.

In setting forth the parameters of Table I, the magnitudes used in Col. 1 represented the outer limit of operability. In Col. 2, values have been set forth which are presently believed to be desirable. A satisfactory target can be produced if a single crystal n-type silicon wafer of between .1 and 10 ohm cm. resistivity is prepared with the ten minute etch described above, and a dielectric layer of approximately 50 A. gold is evaporated onto the obverse, etched surface.

The dielectric layer has a resistivity of approximately $10^{10}$ ohms/sq. and, with a working potential difference of 10 volts, the leakage across the barrier is measured to be 1.0 $\mu$amp/cm.$^2$. Such a device, when used as a transducer, exhibits a charge storage time in excess of .033 sec. and has an acceptable quantum efficiency. Further, the work function for the combination is approximately +2ev.

If n-type germanium is utilized for the semi-conductor, quantum efficiency considerations may require refrigeration of the target element. If p-type materials are used, a different family of "dielectric" materials must be used to achieve the proper "barrier height" and, similarly, a positively charged "scanning and reading" beam must be employed.

In yet other embodiments, particularly intended for use in a vidicon that is sensitive to infrared radiation, it has been found that wafers as thick as three mils may be employed. This seeming contradiction to the previously stated requirement that the thickness be related to the desired resolution, is explained by the fact that infrared photons penetrate the wafer for a substantial distance before the carrier-pair is formed. It has been observed that an acceptable resolution of 500 lines/inch can be achieved, but with a loss of sensitivity and response in the visible and ultraviolet portions of the actinic spectrum.

The charge storage properties of a device according to the present invention are graphically illustrated in FIG. 6, which includes FIGS. 6a and 6b. Given a target, such as is shown in and described in connection with FIGS. 1 through 4, above, an initial electrostatic charge to a voltage $v_i$ will decay, with time, depending upon the magnitude of the voltage $v_i$ and the barrier leakage property of the device. Ideally, for a device to be suitable for use in the present invention, the voltage decay curve with time should be substantially as shown in FIG. 6a, wherein the voltage has dropped only slightly in the $\frac{1}{30}$ of a second, normally utilized as the cycle or frame time.

For structures in which the dielectric layer has a substantially lower resistivity than $10^{10}$ ohms/square, or the leakage across the barrier is substantially greater than 15 $\mu$amps/cm.$^2$, the slope of the curve would increase, representing shortened storage times. The extreme case, of virtually no charge storage, is illustrated by the graph of FIG. 6b, in which $v_i$ decays almost immediately. It is not within the province of this application to determine the acceptable voltage decay rate for a given application. It will be apparent to those skilled in the art that for a particular application, an acceptable charge storage time can be determined, given the initial voltage.

The phenomenon of image dispersal or diffusion resulting from the use of a storage element in which the actinic radiation is applied to one surface and the electrostatic charge is applied to the opposite surface, is best illustrated in FIG. 7, including FIGS. 7a through 7c. FIG. 7b is a representation of a charge storage device, from the obverse side, to which an actinic image of a "T" 60 on a black background 62 is projected on the reverse surface, and the outline of that image is indicated by the dashed lines. Shown in solid lines is the electrostatic image stored on the obverse surface as relatively discharged areas 64 and charged areas 66.

The line 7—7, represents a particular line across the target. FIG. 7a is a graph of the intensity of the actinic radiation along that line while FIG. 7c is a graph drawn, to a common base, of the electrostatic charge profile taken along the same line 7—7 on the obverse surface. As seen in FIG. 7a, the radiation pattern on the reverse surface is substantially black with an abrupt transition to "white" or radiation, and a second, abrupt transition to black, representing one "line" of the actinic image applied to the reverse face. For ease in explanation, a white image on a black background has been utilized to avoid the problem of the gradations of impinging radiation. Assuming a sharp image, the actinic radiation profile of FIG. 7a is substantially a "square" wave.

The scale of FIG. 7b has been exaggerated to emphasize the loss of resolution resulting from the transit of minority carriers from the site of formation at or near the reverse surface to the obverse surface where stored charge is neutralized. As shown in FIG. 7b, the image is slightly "smeared." As will be noted from an examination of FIG. 7c, the electrostatic charge profile, the transition from a $-v_i$ voltage to the 0 or ground voltage, corresponding to a transition from dark to light, is less abrupt and in fact involves a definite charge gradient which, electrically, represents a transition from black to white through shades of gray. Further, it will be understood that FIG. 7 is suggestive only and that the scale is wholly disproportionate.

Although it is not presently economically feasible, the storage device of the present invention may also be used as a xerographic plate, since black toner powders applied to the obverse surface would adhere to the charged areas but not to the discharged areas. Therefore, the electrostatic image could be made visible through the use of such a toner powder, and the image could be transferred, as in the conventional xerographic manner.

Other applications of the present invention may occur to those skilled in the art. Accordingly, the scope of the invention should be limited only by the breadth of the claims appended below.

What is claimed as new is:

1. A transducer for converting an impinging radiant image into a corresponding electrostatic image comprising:
   (a) a photo-responsive wafer of low resistivity semiconductor material for receiving impinging actinic radiation capable of creating charge carrier pairs at the site of impinging radiation, in direct proportion to the intensity and duration of applied radiation;
   (b) a non-conductive layer of a material having an appropriate work function relative to said semiconductor material for receiving an electrically charged beam, said non-conductive layer being adapted to store electrostatic charge at the site of the impinging charged beam, in direct proportion to the intensity and duration of the applied charged beam; and
   (c) a barrier interface layer joining said wafer and said non-conductive layer into a unitary structure, normally insulating, electrically, said wafer from electrostatic charge stored in said non-conductive layer, said barrier layer being permeable to minority charge carriers created in said wafer by actinic radiation impinging on said wafer for neutralizing stored charge in said non-conductive layer in those elemental areas next adjacent and corresponding to the site of the creation of the charge carriers;
   whereby an electrostatic image pattern of relatively charged and discharged areas is created in direct correspondence with an applied actinic radiation image pattern of relatively dark and light areas, the extent of electrostatic discharge in any discrete area of said non-conducting layer being directly related to the duration and intensity of impinging radiation in the discrete area of said wafer corresponding thereto.

2. The transducer of claim 1, wherein said photo-responsive wafer is n-type silicon, and said charged beam imparts a negative electrostatic charge to said non-conductive layer.

3. The transducer of claim 2, wherein said non-conductive layer is gold.

4. The transducer of claim 3, where in said non-conductive layer is a thickness on the order of 50 A.

5. The transducer of claim 1, wherein said barrier layer is created by etching and partially oxidizing a surface of said wafer.

6. The transducer of claim 1, wherein said wafer has a resistivity less than 50 ohm cm.; said barrier layer has an effective resistivity in excess of $10^{10}$ ohm cm.; and said non-conducting layer has a resistivity in excess of 1010 ohms/square.

7. The transducer of claim 1, wherein the leakage current from said non-conducting layer, when charged, across said barrier layer is less than 15 $\mu$amps/cm.$^2$.

8. The transducer of claim 1, wherein the network function of the wafer and non-conducting layer is in excess of $+1.5$ ev.

9. The transducer of claim 1, wherein said wafer is p-type material and said charged beam imparts a positive electrostatic charge to said non-conductive layer.

10. The transducer of claim 1, wherein said wafer is germanium and wherein said wafer is adapted to be refrigerated in use.

11. The transducer of claim 1, wherein the radiant image and the charged beam impinge upon opposite faces of the transducer.

12. The transducer of claim 1, wherein the radiant image and the charged beam both are applied to the surface of said non-conductive layer.

13. The transducer of claim 1, further including means for conducting electrical energy from said wafer.

14. The transducer of claim 13, wherein said means include a radiation transparent matrix of a conductive material in which said wafer is mounted, to receive structural support therefrom.

15. The transducer of claim 1, further including a conductive metal member in ohmic contact with said wafer adapted to couple said wafer to a source of electrical potential.

16. The transducer of claim 15, wherein said conductive metal member is an aluminum ring, plated onto the surface of said wafer.

17. A storage device comprising in combination:
(a) an MBS junction including a non-conductive layer of appropriate work function, a semi-conductor layer and normally non-conducting barrier interface between said non-conductive and semi-conductive layers, which junction exhibits a capacitative effect, having a time constant variable with the quantity of illumination on the storage element;
(b) first means for applying an electrostatic charge to the non-conductive layer for creating a predetermined reverse biasing potential difference across said junction; and
(c) second means for applying illuminating radiation to the semi-conductive layer, for enabling unidirectional electrical conduction across the junction in the region of illumination,
whereby electrostatic charge stored on said non-conductive layer is selectively discharged by unidirectional electrical conduction in those elemental areas next adjacent semi-conductor layer elemental areas illuminated by applied radiation, the extent of discharge being directly proportional to the total applied radiation flux.

18. The storage device of claim 17, wherein said second means is adapted to apply radiation to said semi-conductive layer through said non-conductive layer and said barrier interface.

19. The storage device of claim 17, wherein the work function across said MBS junction is in excess of +1.5 ev.

20. The storage device of claim 17, wherein said semi-conductor layer is of n-type material.

21. The storage device of claim 17, wherein the leakage current across the junction, when reverse biased, is less than 15 $\mu$amps/cm.$^2$.

22. The storage device of claim 17, wherein said non-conductive layer is a very thin gold film on the order of 50 A. in thickness.

23. The storage device of claim 17, wherein said semi-conductor layer is n-type silicon having a resistivity less than 50 ohm cm.

24. The storage device of claim 23, wherein said barrier interface is created by etching and partially oxidizing the surface of said semi-conductor layer to exhibit an effective resistivity in excess of $10^{10}$ ohm cm.

25. The storage device of claim 17, further including ohmic contact means connected to said semi-conductor layer for deriving electrical signals therefrom.

26. The storage device of claim 17, wherein said second means include means for restoring electrostatic charge to selectively discharge areas of said non-conducting layer.

27. The storage device of claim 17, including output means connected to said semi-conductive layer for signalling the quantity of electrostatic charge necessary to restore discharged elemental areas of said non-conductive layer corresponding to and representative of the total radiation applied to the respective next adjacent semi-conductor layer elemental areas.

28. In combination:
(1) a wafer of semi-conductor material of resistivity between .05 and 50 ohm cm. and a photosensitive quantum efficiency greater than .1%;
(2) a barrier layer at one surface of said semi-conductor wafer having a current leakage, at operating potentials, of less than 15 $\mu$amps/cm.$^2$; and
(3) a dielectric layer over said barrier layer of resistivity greater than $10^{10}$ ohms/square, and a network function as between said semi-conductor and said dielectric materials greater than +1.5 ev;
said dielectric layer being adapted to receive and store an electrostatic charge, and to create a reverse bias at said barrier layer, said semi-conductor wafer being adapted to receive impinging radiation for creating charge carrier pairs at the site of impingement, the minority carriers of said pairs migrating through said barrier layer to discharge stored electrostatic charge in areas of said dielectric layer, next adjacent and respectively corresponding to the site of radiation impingement, to create a pattern of charged and discharged, areas representative of an applied radiation pattern of relatively bright and dark areas.

29. The combination of claim 28, above, wherein said semi-conductor material is a single crystal of n-type silicon having a resistivity of 10 ohm cm.

30. The combination of claim 29, above, wherein said barrier layer has an effective resistivity normal to the surface on the order of $10^{10}$ ohm cm. and said current leakage is 10 $\mu$amps/cm.$^2$.

31. The combination of claim 28, above, further including an electrode element in ohmic contact with said wafer adapted to connect to a source of potential and to provide signals representing the charge required to restore electrostatic charge in discharged areas, as a measure of the radiation received by the respectively corresponding semi-conductor areas.

References Cited

UNITED STATES PATENTS

| | | | |
|---|---|---|---|
| 3,087,985 | 4/1963 | Heijne et al. | 315—11 X |
| 3,378,688 | 4/1968 | Kabell | 250—211 |
| 3,403,284 | 9/1968 | Buck et al. | 315—11 |
| 3,409,797 | 11/1968 | Ross | 315—10 |

RODNEY D. BENNETT, JR., Primary Examiner

J. P. MORRIS, Assistant Examiner

U.S. Cl. X.R.

250—211; 313—67